INVENTORS
Donald L. McIntosh and
William D. Waldron
BY Stephen J. Rudy
Jerome Rudy
attys.

United States Patent Office 3,157,195
Patented Nov. 17, 1964

3,157,195
ROTARY VALVE
Donald L. McIntosh, Bay City, and William D. Waldron, Midland, Mich., assignors to The Dow Chemical Company, Midland, Mich., a corporation of Delaware
Filed Sept. 19, 1962, Ser. No. 224,657
2 Claims. (Cl. 137—375)

This invention relates to a plug valve or rotary valve, as the trade more aptly calls the plug valve, and more particularly to an improvement in a rotary valve of the type which is lined with a corrosion resistant material.

Rotary valves having a lining made of a resin, such as saran, have been used with satisfactory results in specialized applications, e.g., piping systems for handling corrosive fluids. Under certain conditions of use, such a rotary valve may be difficult to rotate, and may seize or bind, even when lubrication is provided.

The present invention functions to provide easy turning of lined rotary valves, with or without lubricant, under all conditions of use. Actual tests show that lined rotary valves incorporating the principles of the invention, require only about one-third the torque for valve operation as compared to lined rotary valves not made in accordance with the invention. In addition, the lined rotary valve of the invention, which is arranged to reduce high torque effort in a simple manner, will be found to provide long and satisfactory service.

The main object of this invention is to provide an improvement in a rotary valve of the type which is lined with a corrosion resistant material.

A more specific object is to provide easy turning of a lined rotary valve, whether lubricated or not.

Still another object is to provide an easy turning lined rotary valve arranged to reduce high torque effort in a simple manner and which will provide long and satisfactory service.

Figure 1:
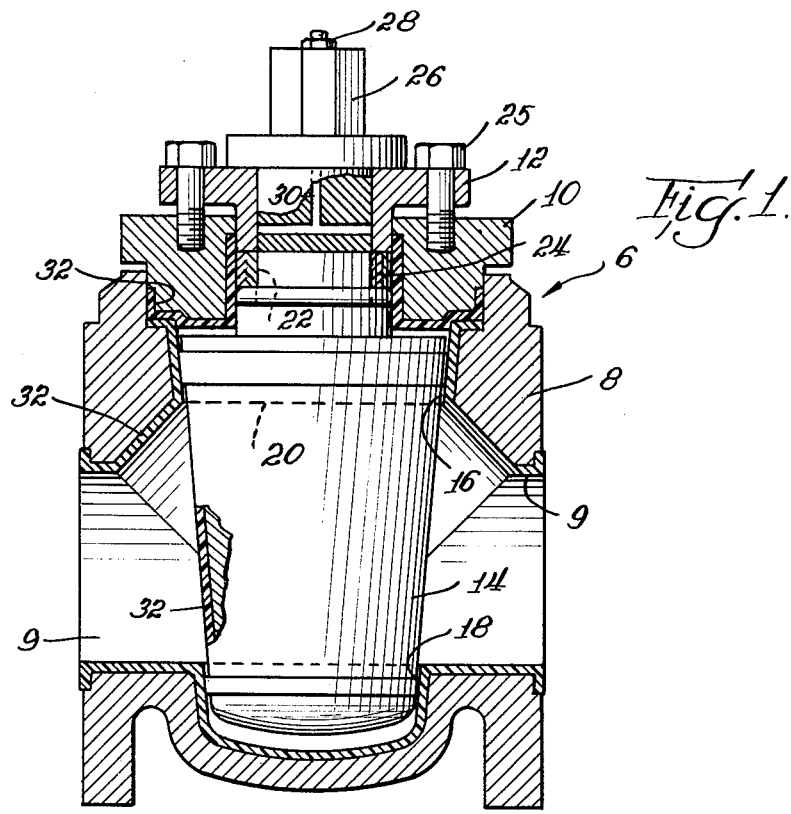
Figure 2:
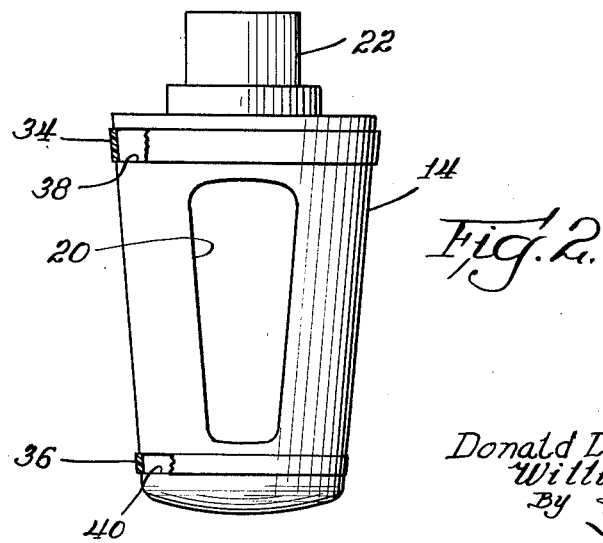

These and further objects and features of the invention will become more apparent from the following description and accompanying drawing wherein:

FIG. 1 is a vertical section view of a lined rotary valve incorporating the principles of the invention; and FIG. 2 is an elevation view of a valve head used in the valve of FIG. 1, and showing in partial section, a snap ring according to the invention and as used in the valve of FIG. 1.

Referring now to the drawing, the numeral 6 identifies a rotary valve including a body portion 8 formed to provide a flow passage 9, a bonnet 10, a stuffing box gland 12, and a rotatable valve or rotary head 14. The vertical surface of the head 14 is tapered and arranged to provide a sliding rotary fit in similarly tapered bores 16 and 18 made in the body portion. An elongated hole, or passageway, 20 is provided in the valve head, to allow passage of fluid through the valve passage 9 when the rotary valve is rotated toward open position. The valve head 14 includes an integral stem or shank portion 22 arranged to extend through the gland 12. A sealing gland 24 is compressively arranged about the shank portion 22, the stuffing box gland 12 being in adjustable engagement therewith by means of bolts 25. A turning nut 26, secured to the top of the head shank, is provided with a grease fitting 28 arranged for admission of lubricant to passageway means 30, whereby the valve stem may be lubricated. Substantially the entire surface of the valve head 14, as well as the interior surfaces of the body portion 8, and bonnet 10, are lined with a corrosion resistant material 32, which may be, for example, a saran resin.

The rotary valve 6 so far described is well known to those skilled in the art and, of course, no claim is made thereon per se.

Rather, the inventive concept relates to a means for reducing the torque required to turn the valve head 14. Toward this end, upper and lower snap-in rings 34 and 36 respectively, are positioned in grooves 38 and 40 formed on the surface of the valve head. The rings 34 and 36 are preferably made of polytetrafluoroethylene, which is chemically inert, and which has been found to possess unusual anti-friction characteristics when used in a valve according to the invention.

Snap-in rings made of polytetrafluoroethylene will be found to be good anti-friction material when used on various other plastics besides saran, as well as metal. The rings 34 and 36, which are arranged to seat upon the bores 16 and 18 respectively, are formed to project a few thousandths of an inch, say .005", beyond the lined surface of the valve head.

Thus in a very simple manner, the problem of reducing torque to turn the valve head, is solved by use of the snap rings 34, 36, arranged in the described fashion. The rings, when made of tetrafluoroethylene, act as anti-friction bearing surfaces and will not seize even when the valve is operated dry, i.e., not lubricated.

The objectives of the invention are thus satisfied in a very simple and low cost manner.

The foregoing description has been given in detail without thought of limitation since the inventive principles involved are capable of assuming other forms without departing from the spirit of the invention or the scope of the following claims.

What is claimed is:

1. In a plastic lined corrosion-resistant rotary valve having a body portion with a flow passage therethrough, and a rotatable valve head therein, the improvement whereby high torque effort normally required to turn such a valve is substantially reduced, comprising at least one annular groove formed on the upper and on the lower surfaces of said valve head adjacent the area of contact with said body portion, each groove containing a snap-in ring formed of a chemically inert plastic, said rings projecting beyond the lined surface of the valve head to act as anti-friction bearing surfaces.

2. The improved rotary valve of claim 1 wherein said rings are made of polytetrafluoroethylene.

References Cited in the file of this patent

UNITED STATES PATENTS

| | | |
|---|---|---|
| 2,728,550 | Sinkler | Dec. 27, 1955 |
| 2,868,499 | Kaminsky | Jan. 13, 1959 |
| 2,950,081 | Steinbuch et al. | Aug. 23, 1960 |
| 3,048,191 | Crane | Aug. 7, 1962 |
| 3,073,336 | Johnson | Jan. 15, 1963 |